United States Patent
Stone et al.

(10) Patent No.: US 10,066,144 B2
(45) Date of Patent: Sep. 4, 2018

(54) COPOLYMER SURFACTANTS FOR USE IN DOWNHOLE FLUIDS

(71) Applicant: Halliburton Energy Services, Inc., Houston, TX (US)

(72) Inventors: Shantel J Stone, Conroe, TX (US); Ryan Patrick Collins, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 240 days.

(21) Appl. No.: 14/387,429

(22) PCT Filed: Nov. 8, 2013

(86) PCT No.: PCT/US2013/069152
§ 371 (c)(1),
(2) Date: Sep. 23, 2014

(87) PCT Pub. No.: WO2015/069273
PCT Pub. Date: May 14, 2015

(65) Prior Publication Data
US 2016/0264833 A1   Sep. 15, 2016

(51) Int. Cl.
*C09K 8/68* (2006.01)
*C09K 8/035* (2006.01)
(Continued)

(52) U.S. Cl.
CPC .............. *C09K 8/035* (2013.01); *C08K 3/34* (2013.01); *C08L 71/02* (2013.01); *C09K 8/12* (2013.01); *C09K 8/52* (2013.01); *C09K 8/68* (2013.01)

(58) Field of Classification Search
CPC ........... C08K 3/34; C08L 71/02; C09K 8/035; C09K 8/12; C09K 8/52; C09K 8/68
See application file for complete search history.

(56) References Cited

U.S. PATENT DOCUMENTS

| 4,753,973 A | 6/1988 | Hsieh |
| 5,622,649 A * | 4/1997 | Hunter .................... A61K 8/06 |
| | | 514/941 |

(Continued)

FOREIGN PATENT DOCUMENTS

| WO | WO-90/10043 A1 | 9/1990 |
| WO | WO-00/26321 A1 | 5/2000 |

(Continued)

OTHER PUBLICATIONS

"Block copolymers", INEOS OXIDE, Technical Data Sheet, (2004), 1-6.
(Continued)

*Primary Examiner* — Alicia Bland
(74) *Attorney, Agent, or Firm* — Tenley Krueger; Tumey L.L.P.

(57) ABSTRACT

Various embodiments disclosed relate to hydroxy-terminated poly(alkylene oxide) copolymer surfactants for use downhole, downhole compositions including the same, and methods of using the same. In various embodiments, the present invention provides a method of treating a subterranean formation. The method can include obtaining or providing a composition including a hydroxy-terminated poly (alkylene oxide) copolymer surfactant. The copolymer surfactant can include a first repeating unit having the structure —[$R_1O$]—, wherein at each occurrence $R^1$ is independently a substituted or unsubstituted ($C_2$-$C_{10}$)alkylene group. The copolymer surfactant can include a second repeating unit having the structure —[$R_2O$]—, wherein at each occurrence $R^2$ is independently a substituted or unsubstituted ($C_2$-$C_{10}$)alkylene group. The first repeating unit can have a lower molecular weight than the second repeating unit. The first repeating unit and the second repeating unit can have a random copolymer or block copolymer arrangement in the copolymer surfactant. The method can also (Continued)

include placing the composition in a subterranean formation downhole.

13 Claims, 2 Drawing Sheets

(51) Int. Cl.
C09K 8/12 (2006.01)
C09K 8/52 (2006.01)
C08L 71/02 (2006.01)
C08K 3/34 (2006.01)

(56) References Cited

U.S. PATENT DOCUMENTS

| | | | |
|---|---|---|---|
| 5,652,200 A | 7/1997 | Davies et al. | |
| 5,981,446 A * | 11/1999 | Qiu | B01F 3/0861 166/308.5 |
| 2008/0169103 A1 | 7/2008 | Carbajal et al. | |
| 2009/0107681 A1 | 4/2009 | Hough et al. | |
| 2009/0149557 A1 * | 6/2009 | Talingting-Pabalan | B01D 17/047 516/182 |
| 2009/0281004 A1 | 11/2009 | Ali et al. | |
| 2011/0021384 A1 | 1/2011 | Watson et al. | |
| 2011/0056683 A1 * | 3/2011 | Duncum | C09K 8/032 166/276 |
| 2011/0124783 A1 | 5/2011 | Villard et al. | |
| 2011/0139506 A1 * | 6/2011 | Lovorn | E21B 21/08 175/25 |
| 2011/0160102 A1 * | 6/2011 | Jackson | C09K 8/588 507/230 |
| 2013/0043028 A1 | 2/2013 | Chakraborty et al. | |

FOREIGN PATENT DOCUMENTS

| WO | WO-2006056774 A2 | 6/2006 |
|---|---|---|
| WO | WO-2015/069273 A1 | 5/2015 |
| WO | WO-2015/069273 A8 | 5/2015 |

OTHER PUBLICATIONS

"International Application Serial No. PCT/US2013/069152, International Search Report dated Aug. 19, 2014", 3 pgs.

"International Application Serial No. PCT/US2013/069152, Written Opinion dated Aug. 19, 2014", 10 pgs.

Canadian Office Action for Canadian Application No. 2,924,641 dated May 1, 2017.

* cited by examiner

COPOLYMER SURFACTANTS FOR USE IN DOWNHOLE FLUIDS

CLAIM OF PRIORITY

This application is a U. S. National Stage Filing under 35 U.S.C. § 371 of International Application PCT/US2013/069152, filed on Nov. 8, 2013, which application is hereby incorporated by reference herein in its entirety.

BACKGROUND OF THE INVENTION

In oilfield operations, surfactants can be used in drilling for a variety of functions such as lubrication, enhancement of wetting, corrosion control, and foaming. For example, when used in water-based drilling muds, surfactants can help to control or avoid accumulation of clays on the bit and drill-string, which can cause undesirable "bit-balling." Surfactants can provide a coating on the clay or on the drilling string or drill bit, reducing or eliminating accumulation of sticky clays.

Surfactants such as sulfonates are generally combined with a carrier fluid to put them into solution prior to addition to a drilling fluid composition. The carrier fluids used to put surfactants into liquid form dilute the surfactant, raising the volume of material that is transported to a drill site and requiring a larger addition to a downhole fluid to achieve a given surfactant effect. In addition, the carrier fluids can present environmental issues due to toxicity. Also, many surfactants produce excessive foam when mixed into a drilling fluid, which can negatively affect the properties of the drilling fluid, such as rheology and gel strength.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
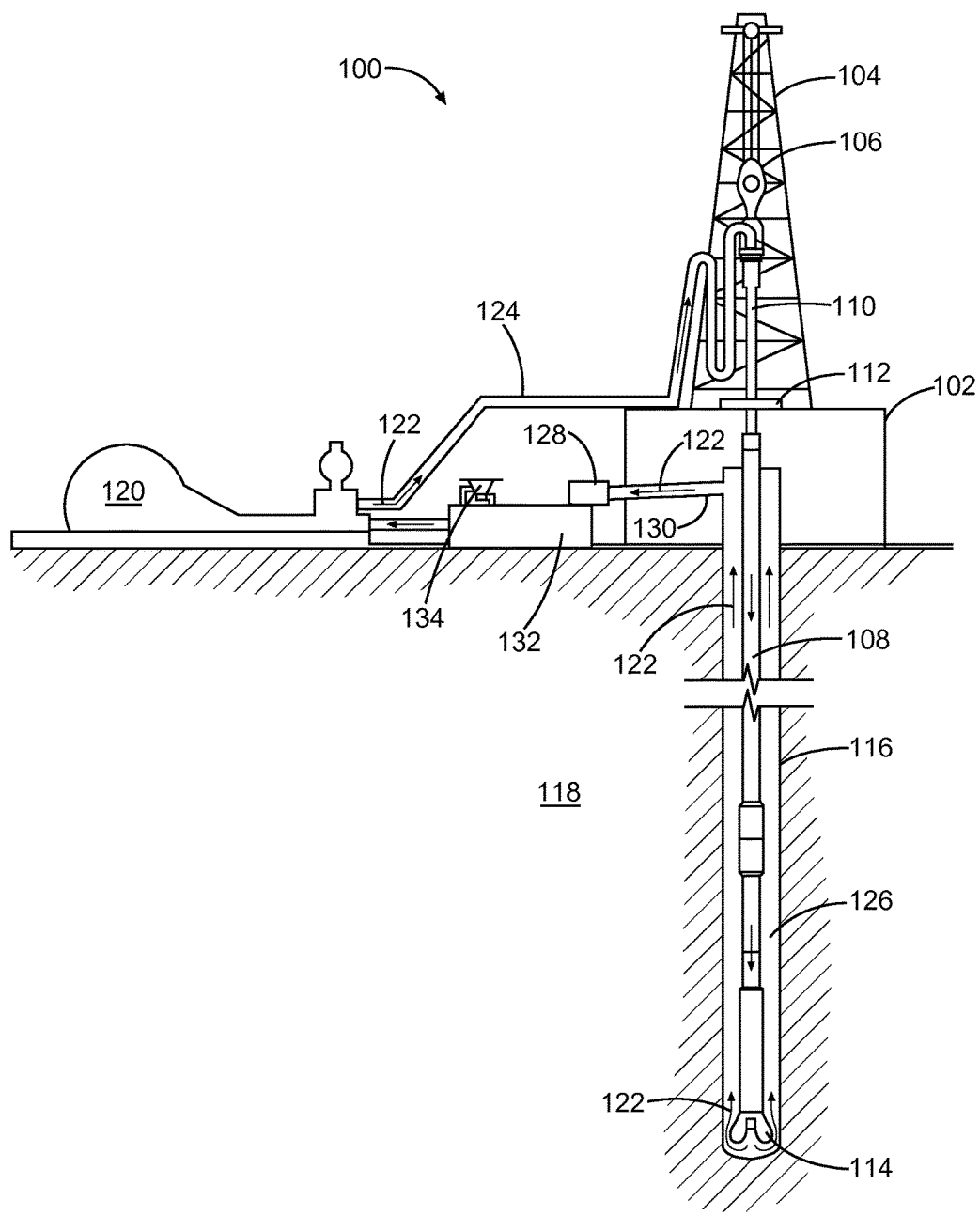
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750, 000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

In various embodiments, the present invention provides a method of treating a subterranean formation. The method includes obtaining or providing a composition including a hydroxy-terminated poly(alkylene oxide) copolymer surfactant. The copolymer surfactant includes a first repeating unit having the structure —[$R_1$O]—. At each occurrence $R^1$ is independently a substituted or unsubstituted ($C_2$-$C_{10}$)alkylene group. The copolymer surfactant also includes a second repeating unit having the structure —[$R_2$O]—. At each occurrence $R^2$ is independently a substituted or unsubstituted ($C_2$-$C_{10}$)alkylene group. The first repeating unit has a lower molecular weight than the second repeating unit. The first repeating unit and the second repeating unit have a random copolymer or block copolymer arrangement in the copolymer surfactant. At least one of a) the copolymer surfactant has a Davies HLB value of at least about 15, and b) the copolymer surfactant has a molecular weight of about 2,000 to about 25,000 and a total weight of the first repeating units is about 10 wt % to about 95 wt % of the copolymer surfactant. The method also includes placing the composition in a subterranean formation downhole.

In various embodiments, the present invention provides a method of treating a subterranean formation. The method includes obtaining or providing a composition including a hydroxy-terminated poly(alkylene oxide) copolymer surfactant. The copolymer surfactant has a first repeating unit and a second repeating unit. The first repeating unit has the structure —[$R_1$O]— wherein $R^1$ is an ethylene group. The second repeating unit having the structure —[$R_2$O]— wherein $R^2$ is a propylene group. The first repeating unit has a lower molecular weight than the second repeating unit. The first repeating unit and the second repeating unit have a random copolymer or block copolymer arrangement in the copolymer surfactant. The copolymer surfactant has a Davies HLB value of about 20 to about 100 calculated as [number of OH groups in the copolymer surfactant]×1.5+[number of oxyethyl units in the copolymer surfactant]×0.33−[number of oxypropyl units in the copolymer surfactant]×0.15. The method also includes placing the composition in a subterranean formation downhole.

In various embodiments, the present invention provides a method of treating a subterranean formation. The method includes obtaining or providing a composition including a hydroxy-terminated poly(alkylene oxide) copolymer surfactant. The copolymer surfactant has a first repeating unit and a second repeating unit. The first repeating unit has the structure —[$R_1$O]— wherein $R^1$ is an ethylene group. The second repeating unit has the structure —[$R_2$O]— wherein $R^2$ is a propylene group. The first repeating unit has a lower molecular weight than the second repeating unit. The first repeating unit and the second repeating unit have a random copolymer or block copolymer arrangement in the copolymer surfactant. The copolymer surfactant has a molecular weight of about 4,500 to about 15,000 and a total molecular weight of the first repeating unit is about 60 wt % to about 90 wt % of the copolymer surfactant. The method also includes placing the composition in a subterranean formation downhole.

In various embodiments, the present invention provides a method of treating a subterranean formation. The method includes obtaining or providing a hydroxy-terminated poly(alkylene oxide) copolymer surfactant. The copolymer surfactant has a first repeating unit and a second repeating unit. The first repeating unit has the structure —[$R_1$O]— wherein $R^1$ is an ethylene group. The second repeating unit has the structure —[$R_2$O]— wherein $R^2$ is a propylene group. The first repeating unit has a lower molecular weight than the second repeating unit. The first repeating unit and the second repeating unit have a random copolymer or block copolymer arrangement in the copolymer surfactant. The surfactant is a solid at room temperature. The method includes combining the surfactant with a downhole fluid, to form a downhole composition. The method also includes placing the composition in a subterranean formation downhole.

In various embodiments, the present invention provides a system. The system includes a composition including a hydroxy-terminated poly(alkylene oxide) copolymer surfactant. The copolymer surfactant includes a first repeating unit having the structure —[$R_1$O]—. At each occurrence $R^1$ is independently a substituted or unsubstituted ($C_2$-$C_{10}$)alkylene group. The copolymer surfactant includes a second repeating unit having the structure —[$R_2$O]—. At each occurrence $R^2$ is independently a substituted or unsubstituted ($C_2$-$C_{10}$)alkylene group. The first repeating unit has a lower molecular weight than the second repeating unit. The first repeating unit and the second repeating unit have a random copolymer or block copolymer arrangement in the copolymer surfactant. At least one of a) the copolymer surfactant has a Davies HLB value of at least about 15, and b) the copolymer surfactant has a molecular weight of about 2,000 to about 25,000 and a total weight of the first repeating units is about 10 wt % to about 95 wt % of the copolymer surfactant. The system also includes a subterranean formation including the composition therein.

In various embodiments, the present invention provides a composition for treatment of a subterranean formation. The composition includes a hydroxy-terminated poly(alkylene oxide) copolymer surfactant. The copolymer surfactant includes a first repeating unit having the structure —[$R_1$O]—. At each occurrence $R^1$ is independently a substituted or unsubstituted ($C_2$-$C_{10}$)alkylene group. The copolymer surfactant includes a second repeating unit having the structure —[$R_2$O]—. At each occurrence $R^2$ is independently a substituted or unsubstituted ($C_2$-$C_{10}$)alkylene group. The first repeating unit has a lower molecular weight than the second repeating unit. The first repeating unit and the second repeating unit have a random copolymer or block copolymer arrangement in the copolymer surfactant. At least one of a) the copolymer surfactant has a Davies HLB value of at least about 15, and b) the copolymer surfactant has a molecular weight of about 2,000 to about 25,000 and a total weight of the first repeating units is about 10 wt % to about 95 wt % of the copolymer surfactant. The composition also includes a downhole fluid.

In various embodiments, the present invention provides a method of preparing a composition for treatment of a subterranean formation. The method includes forming a composition including a hydroxy-terminated poly(alkylene oxide) copolymer surfactant. The copolymer surfactant includes a first repeating unit having the structure —[$R_1O$]—. At each occurrence $R^1$ is independently a substituted or unsubstituted ($C_2$-$C_{10}$)alkylene group. The copolymer surfactant also includes a second repeating unit having the structure —[$R_2O$]—. At each occurrence $R^2$ is independently a substituted or unsubstituted ($C_2$-$C_{10}$)alkylene group. The first repeating unit has a lower molecular weight than the second repeating unit. The first repeating unit and the second repeating unit have a random copolymer or block copolymer arrangement in the copolymer surfactant. At least one of a) the copolymer surfactant has a Davies HLB value of at least about 15, and b) the copolymer surfactant has a molecular weight of about 2,000 to about 25,000 and a total weight of the first repeating units is about 10 wt % to about 95 wt % of the copolymer surfactant.

Various embodiments of the present invention provide certain advantages over other downhole surfactants and compositions, methods, or systems including the same, at least some of which are unexpected. In various embodiments, the copolymer surfactant can be added as a solid to a downhole fluid. In some embodiments, the addition of the copolymer surfactant as a solid can avoid the use of carrier fluids, reducing the transportation costs as compared to surfactants that require carrier fluids. In some embodiments, the addition of the copolymer surfactant as a solid can produce a greater surfactant effect per volume or per mass of surfactant added, increasing efficiency by reducing the required concentration, which can shorten the time and energy needed to add and blend the surfactant with the downhole fluid. In various embodiments, by avoiding the use of carrier fluids, use of the copolymer surfactant can present fewer environmental issues as compared to the use of other surfactants. In some embodiments, increased environmental friendliness can make the copolymer surfactant more useful as compared to other surfactants, such as usable in greater quantities and easier to use in a wider variety of environments.

In various embodiments, the copolymer surfactant can have a greater activity per mass or per volume as compared to other surfactants, such as compared to sulfonate surfactants or carrier liquid-diluted surfactants. In some embodiments, the copolymer surfactant can provide improved surfactant properties, as compared to other surfactants, such as at least one of better rate of drill bit penetration, reduction of clay sticking, cleaning of the bit and drill pipe, recovery of fracturing fluids, reduction of corrosion, enhancement of wetting, and enhancement of lubrication. In some embodiments, the copolymer surfactant can produce less foam than other surfactants, such as when used in a drilling fluid. In some embodiments, the copolymer surfactant can be used in a downhole fluid with less negative effects or with no negative effects on rheology or gel strength of the downhole fluid, as compared to other surfactants. In some embodiments, in contrast with other surfactants, the surfactant (e.g., a solid surfactant) can partially or fully retain surfactant activity after undergoing freeze-thaw cycles.

Method of Treating a Subterranean Formation.

Various embodiments of the present invention provide a method of treating a subterranean formation. The method includes obtaining or providing a composition including hydroxy-terminated poly(alkylene oxide) copolymer surfactant. The obtaining or providing of the composition can occur at any suitable time and at any suitable location. The obtaining or providing of the composition can occur above the surface. The obtaining or providing of the composition can occur downhole. The method also includes placing the composition in a subterranean formation. The placing of the composition in the subterranean formation can include contacting the composition and any suitable part of the subterranean formation, or contacting the composition and a subterranean material downhole, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

In some embodiments, the method can be a method of drilling. The method can further include performing a drilling operation after placing the composition in the subterranean formation. The composition can include a drilling fluid; the composition can be a drilling fluid. The drilling fluid can be an aqueous drilling fluid. Obtaining or providing the composition can include obtaining or providing a drilling fluid, and combining the hydroxy-terminated poly(alkylene oxide) copolymer surfactant with the drilling fluid, to provide the composition. Placing the composition in the subterranean formation can include pumping the composition into a drill-string disposed in a wellbore, the drill-string including a drill bit at a downhole end of the drill-string. The method can further include circulating the drilling fluid composition through the drill-string, through the drill bit, and back above-surface through an annulus between the drill-string and the wellbore. The method can further include processing the composition exiting the annulus with at least one fluid processing unit to generate a cleaned composition and recirculating the cleaned composition through the wellbore The method can be a method of hydraulic fracturing, such as a method of hydraulic fracturing to generate a fracture or flow pathway. The composition can include a fracturing fluid; the composition can be a fracturing fluid. The fracturing fluid can be an aqueous fracturing fluid, having a continuous phase that is aqueous. The copolymer surfactant in the fracturing fluid can increase wetting, increase homogeneity of the fracturing fluid, and can increase the ease of recovery of the fracturing fluid. The composition can further include a proppant, a resin-coated proppant, or a combination thereof. Obtaining or providing the composition can include obtaining or providing a fracturing fluid and combining the hydroxy-terminated poly(alkylene oxide) copolymer surfactant with the fracturing fluid, to provide the composition. Placing the composition in the subterranean formation can include pumping the composition into the subterranean formation via a tubular.

The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

The hydroxy-terminated poly(alkylene oxide) copolymer surfactant can be any suitable weight percent of the composition including the copolymer surfactant, such as about 0.001 wt % to about 40 wt %, 0.01 wt % to about 20 wt %, about 0.1 wt % to about 10 wt %, about 0.5 wt % to about 5 wt %, or about 0.001 wt % or less, 0.01 wt %, 0.1, 0.5, 1, 1.5, 2, 2.5, 3, 3.5, 4, 4.5, 5, 6, 7, 8, 9, 10, 12, 14, 16, 18, 20, 25, 30, 35, or about 40 wt % or more.

Hydroxy-terminated Poly(Alkylene Oxide) Copolymer Surfactant.

The hydroxy-terminated poly(alkylene oxide) copolymer surfactant can have any suitable properties, and can influence the properties of the composition including the copolymer surfactant in any suitable way, consistent with the chemical structures of the copolymer surfactant described herein.

The copolymer surfactant can have any suitable influence on the viscosity of the composition including the copolymer surfactant. In some embodiments, the copolymer surfactant has substantially no effect on the viscosity of the composition including the copolymer surfactant. In some embodiments, as compared to a corresponding composition not including the hydroxy-terminated poly(alkylene oxide) copolymer surfactant, the composition has a viscosity that is about 0% to about 60% lower, about 0% to about 30% lower, about 0% to about 10% lower, or about 60% or more lower, about 55% lower, 50, 45, 40, 35, 30, 25, 20, 18, 16, 14, 12, 10, 9, 8, 7, 6, 5, 4, 3, 2, 1, 0.5, 0.1, 0.01, 0.001, 0.0001% or less lower.

The copolymer surfactant can have any suitable melting point, such as a melting point of about 30° C. to about 100° C., about 40° C. to about 65° C., about 47° C. to about 58° C., or about 30° C. or less, about 32° C., 34, 36, 38, 40, 42, 44, 46, 47, 48, 49, 50, 51, 52, 53, 54, 55, 56, 57, 58, 60, 62, 64, 66, 68, 70, 72, 74, 76, 78, 80, 85, 90, 95, or about 100° C. or more. In various embodiments the copolymer surfactant can have a melting point greater than room temperature, such that the copolymer surfactant is a solid at room temperature.

The copolymer surfactant can have any suitable cloud point in any suitable solvent, the temperature at which dissolved solids are no longer completely soluble causing them to precipitate at least slightly giving the fluid a cloudy appearance. In some embodiments, 1 wt % aqueous solution of the copolymer surfactant can have a cloud point of less than about 0° C., or about 0° C., 5, 10, 15, 20, 25, 30, 35, 40, 45, 50, 55, 60, 65, 70, 75, 80, 85, 90, 95, about 100° C., or greater than about 100° C. The copolymer surfactant can have any suitable water solubility, such as a water solubility at 25° C. of about 0.000,001 g/100 g water to about 50 g/100 g water, about 0.001 g/100 g water to about 40 g/100 g water, about 0.1 g/100 g water to about 25 g/100 g water, or about 0.000,001 g/100 g water or less, or about 0.00001 g/100 g water, 0.0001, 0.001, 0.01, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 42, 44, 46, 48, or about 50 g/100 g water.

Any suitable percentage of the copolymer surfactant can be dissolved in the composition that includes the copolymer surfactant. For example, 0.000.1 wt % to about 100 wt % of the copolymer surfactant can be dissolved, or about 1 wt % to about 100 wt %, 1 wt % to about 50 wt %, less than 25 wt %, less than 10 wt %, 50 wt % to about 100 wt %, more than 75 wt %, more than 90 wt %, or about 0.000.1 wt % or less, 0.001, 0.01, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99 wt %, or about 99.999 wt % or more of the copolymer surfactant is dissolved in the composition.

The copolymer surfactant can have any suitable hydrophilic-lipophilic balance (HLB) value, such as Griffin's HLB or Davies HLB, which are a measure of the degree to which the copolymer surfactant is hydrophilic or lipophilic, with lower numbers indicating lipophilicity, and higher numbers indicating hydrophilicity. In some embodiments, the Davies HLB value can include the calculation [number of OH groups in the copolymer surfactant]×1.5+[number of oxyethyl units in the copolymer surfactant]×0.33−[number of oxypropyl units in the copolymer surfactant]×0.15. In some embodiments, the Davies HLB value of the copolymer surfactant can be at least about 15, 16, 17, 18, 19, 20, 21, 22, 23, 24, 25, 26, 27, 28, 29, or at least about 30, or about 15 to about 150, about 20 to about 100, about 24 to about 90, or about 15 or less, about 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 95, 100, 105, 110, 115, 120, 125, 130, 135, 140, 145, or about 150 or more.

The copolymer surfactant can have any suitable number-average molecular weight, such as about 1,000 to about 120,000, 1,000 to about 50,000, 4,500 to about 15,000, or about 1,000 or less, 2,500, 5,000, 5,500, 6,000, 6,500, 7,000, 7,500, 8,000, 8,500, 9,000, 9,500, 10,000, 10,500, 11,000, 11,500, 12,000, 12,500, 13,000, 13,500, 14,000, 14,500, 15,000, 17,500, 20,000, 25,000, 30,000, 35,000, 40,000, 45,000, or about 50,000.

The copolymer surfactant can have any suitable structure, such that the copolymer surfactant has surfactant properties, and such that the copolymer surfactant can be used to perform an embodiment of the method as described herein. The hydroxy-terminated poly(alkylene oxide) copolymer can be a linear polymer, such that the repeating units are connected to one another in a linear end-to-end fashion to form a linear backbone. A linear polymer can include repeating units that include branched groups such as branched alkanes, but does not include grafted repeating units on the backbone of the polymer.

The hydroxy-terminated poly(alkylene oxide) copolymer surfactant can include a first repeating unit having the structure —[$R_1$O]—, wherein at each occurrence $R^1$ is independently a substituted or unsubstituted ($C_2$-$C_{10}$)alkylene group. The copolymer surfactant can include a second repeating unit having the structure —[R$_2$O]—, wherein at each occurrence R$^2$ is independently a substituted or unsubstituted (C$_2$-C$_{10}$)alkylene group.

A total weight of the first repeating unit in the copolymer surfactant molecule can form any suitable wt % of the copolymer surfactant, such as about 50 wt % to about 95 wt %, about 60 wt % to about 90%, about 70 wt % to about 80 wt %, or about 50 wt % or less, about 55, 60, 66, 68, 70, 71, 72, 73, 74, 75, 76, 77, 78, 79, 80, 82, 84, 85, 90, or about 95 wt % or more. The number-average molecular weight of the first repeating unit of the copolymer surfactant can be any suitable molecular weight, such as about 500 to about 120,000, about 2,300 to about 40,000, or about 500 or less, 1,000, 2,500, 3,000, 3,500, 4,000, 4,500, 5,000, 5,500, 6,000, 6,500, 7,000, 7,500, 8,000, 8,500, 9,000, 9,500, 10,000, 10,500, 11,000, 12,500, 15,000, 20,000, 25,000, 30,000, 35,000, 40,000, 50,000, 75,000, 100,000, or about 120,000 or more.

A total weight of the second repeating unit in the copolymer surfactant molecule can form any suitable wt % of the copolymer surfactant, such as about 5 wt % to about 50 wt %, about 10 wt % to about 40 wt %, about 20 wt % to about 30 wt %, 5 wt % or less, 10 wt %, 15, 16, 18, 20, 21, 22, 23, 24, 25, 26, 27, 28, 29, 30, 32, 34, 35, 40, 45, or about 50 wt % or more. The number-average molecular weight of the second repeating unit of the copolymer surfactant can be any suitable molecular weight, such as about 500 to about 6,000, about 950 to about 4,000, or about 500 or less, about 1,000, 1,500, 2,000, 2,500, 3,000, 3,500, 4,000, 4,500, 5,000, 5,500, or about 6,000 or more.

In some embodiments, the first repeating unit and the second repeating unit of the hydroxy-terminated poly(alkylene oxide) copolymer surfactant can be the only two repeating units of the copolymer surfactant. The hydroxy-terminated poly(alkylene oxide) copolymer surfactant can have the structure:

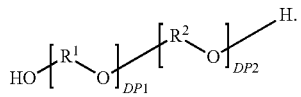

The repeating units can have a random or block copolymer arrangement in the copolymer surfactant. The variable DP1 can be about 10 to about 2800, about 50 to about 910, or about 10 or less, about 50, 100, 150, 200, 250, 300, 350, 400, 450, 500, 550, 600, 650, 700, 750, 800, 850, 900, 950, 1,000, 1,200, 1,400, 1,600, 1,800, 2,000, 2,200, 2,400, 2,600, or about 2,800 or more. The variable DP2 can be about 50 to about 910, about 70 to about 260, or about 50 or less, about 70, 80, 90, 100, 120, 140, 160, 180, 200, 220, 240, 280, 300, 350, 400, 450, 500, 550, 600, 650, 700, 750, 800, 850, 900, or about 950 or more.

In some embodiments, at each occurrence R$^1$ is independently a (C$_2$-C$_{10}$)alkylene group, e.g., an unsubstituted alkylene group. At each occurrence R$^1$ can be independently a (C$_2$-C$_5$)alkylene group. At each occurrence R$^1$ can be independently a (C$_2$-C$_3$)alkylene group. The variable R$^1$ can be ethylene. The first repeating unit can be oxyethyl.

In some embodiments, at each occurrence R$^2$ is independently a (C$_2$-C$_{10}$)alkylene group, e.g., an unsubstituted alkylene group. At each occurrence R$^2$ can be independently a (C$_3$-C$_4$)alkylene group. At each occurrence R$^2$ can be independently a (C$_3$)alkylene group. The variable R$^2$ at each occurrence can be a propyl group connected to the copolymer backbone via the 1- and 2-positions. The second repeating unit at each occurrence can be independently selected from the group consisting of a 1-oxy-prop-2-yl group and a 2-oxy-prop-1-yl group.

The hydroxy-terminated poly(alkylene oxide) copolymer surfactant can have the structure:

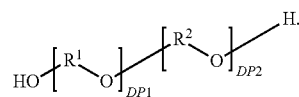

The first repeating unit and the second repeating unit can be in a block-copolymer arrangement in the order shown.

The hydroxy-terminated poly(alkylene oxide) copolymer surfactant can have the structure:

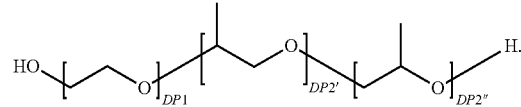

The repeating units having subscripts DP2' and DP2" together can be the second repeating unit. The variable DP2' can be about 0 to about 910, or about 50, 100, 150, 200, 250, 300, 350, 400, 450, 500, 550, 600, 650, 700, 750, 800, 850, or about 900 or more. The variable DP2" can be about 0 to about 910, or about 50, 100, 150, 200, 250, 300, 350, 400, 450, 500, 550, 600, 650, 700, 750, 800, 850, or about 900 or more. The sum DP2'+DP2" can equal to about DP2. The first repeating unit and the second repeating unit can be in a block-copolymer arrangement in the order shown. The 1-oxy-prop-2-yl and 2-oxy-prop-1-yl units can occur in a block or random arrangement within each poly(propylene oxide) block.

The hydroxy-terminated poly(alkylene oxide) copolymer surfactant can have the structure:

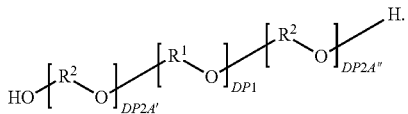

The variable DP2A' can be about 0 to about 910, or about 50, 100, 150, 200, 250, 300, 350, 400, 450, 500, 550, 600, 650, 700, 750, 800, 850, or about 900 or more. The variable DP2A" can be about 0 to about 910, or about 50, 100, 150, 200, 250, 300, 350, 400, 450, 500, 550, 600, 650, 700, 750, 800, 850, or about 900 or more. The sum DP2A'+DP2A" can be equal to about DP2. The first repeating unit and the second repeating units can be in a block-copolymer arrangement in the order shown. The hydroxy-terminated poly(alkylene oxide) copolymer surfactant can have the structure:

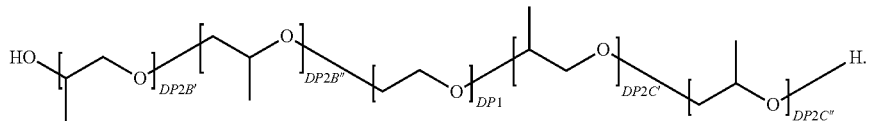

The repeating units having subscripts DP2B' and DP2B" together can be at least one of the second repeating units. The repeating units having subscripts DP2C' and DP2C" together can be at least one of the second repeating units. The variable DP2B' can be about 0 to about 910. The variable DP2B" can be about 0 to about 910, or about 50, 100, 150, 200, 250, 300, 350, 400, 450, 500, 550, 600, 650, 700, 750, 800, 850, or about 900 or more. The sum DP2B'+DP2B" can be equal to about DP2A'. The variable DP2C' can be about 0 to about 910, or about 50, 100, 150, 200, 250, 300, 350, 400, 450, 500, 550, 600, 650, 700, 750, 800, 850, or about 900 or more. The variable DP2C" can be about 0 to about 910. The sum DP2C'+DP2C" can equal about DP2A". The first repeating unit and the second repeating unit can be in a block-copolymer arrangement in the order shown. The 1-oxy-prop-2-yl and 2-oxy-prop-1-yl units can occur in a block or random arrangement within each poly (propylene oxide) block.

The hydroxy-terminated poly(alkylene oxide) copolymer surfactant can have the structure:

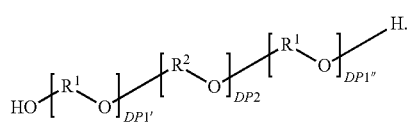

The variable DP1' can be about 0 to about 2800, or about 200 or less, 400, 600, 800, 1,000, 1,2000, 1,400, 1,600, 1,800, 2,000, 2,200, 2,400, 2,600, or about 2,800 or more. The variable DP1" can be about 0 to about 2800, or about 200 or less, 400, 600, 800, 1,000, 1,2000, 1,400, 1,600, 1,800, 2,000, 2,200, 2,400, 2,600, or about 2,800 or more. The sum DP1'+DP1" can be about equal to DP1. The first repeating unit and the second repeating units can be in a block-copolymer arrangement in the order shown.

The hydroxy-terminated poly(alkylene oxide) copolymer surfactant can have the structure:

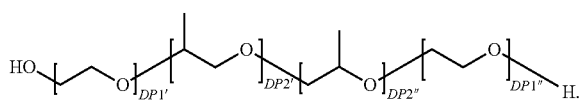

The variable DP1' can be about 0 to about 2800, or about 200 or less, 400, 600, 800, 1,000, 1,2000, 1,400, 1,600, 1,800, 2,000, 2,200, 2,400, 2,600, or about 2,800 or more. The variable DP1" can be about 0 to about 2800, or about 200 or less, 400, 600, 800, 1,000, 1,2000, 1,400, 1,600, 1,800, 2,000, 2,200, 2,400, 2,600, or about 2,800 or more. The sum DP1'+DP1" can be about equal to DP1. The repeating units having subscripts DP2' and DP2" together can be the second repeating unit. The variable DP2' can be about 0 to about 910, or about 50, 100, 150, 200, 250, 300, 350, 400, 450, 500, 550, 600, 650, 700, 750, 800, 850, or about 900 or more. The variable DP2" can be about 0 to about 910, or about 50, 100, 150, 200, 250, 300, 350, 400, 450, 500, 550, 600, 650, 700, 750, 800, 850, or about 900 or more. The sum DP2'+DP2" can equal about DP2. The first repeating unit and the second repeating unit can be in a block-copolymer arrangement in the order shown. The 1-oxy-prop-2-yl and 2-oxy-prop-1-yl units can occur in a block or random arrangement within each poly(propylene oxide) block.

In some embodiments, the hydroxy-terminated poly(alkylene oxide) copolymer surfactant is a Pluronic® surfactant, such as at least one of Pluronic® 10R5, Pluronic® 17R2, Pluronic® 17R4, Pluronic® 25R2, Pluronic® 25R4, Pluronic® 31R1, Pluronic® F 108, Pluronic® F 108 NF, Pluronic® F 108 Pastille, Pluronic® F 108NF Prill Poloxamer 338, Pluronic® F 127, Pluronic® F 127 NF, Pluronic® F 127 NF 500 BHT Prill, Pluronic® F 127 NF Prill Poloxamer 407, Pluronic® F 38, Pluronic® F 38 Pastille, Pluronic® F 68, Pluronic® F 68 LF Pastille, Pluronic® F 68 NF, Pluronic® F 68 NF Prill Poloxamer 188, Pluronic® F 68 Pastille, Pluronic® F 77, Pluronic® F 77 Micropastille, Pluronic® F 87, Pluronic® F 87 NF, Pluronic® F 87 NF Prill Poloxamer 237, Pluronic® F 88, Pluronic® F 88 Pastille, Pluronic® F 98, Pluronic® FT L 61, Pluronic® L 10, Pluronic® L 101, Pluronic® L 121, Pluronic® L 31, Pluronic® L 35, Pluronic® L 43, Pluronic® L 61, Pluronic® L 62, Pluronic® L 62 LF, Pluronic® L 62D, Pluronic® L 64, Pluronic® L 81, Pluronic® L 92, Pluronic® L44 NF INH surfactant Poloxamer 124, Pluronic® N 3, Pluronic® P 103, Pluronic® P 104, Pluronic® P 105, Pluronic® P 123, Pluronic® P 65, Pluronic® P 84, and Pluronic® P 85. In some embodiments, the copolymer surfactant is at least one of Pluronic® F 108 Pastille, Pluronic® F 38 Pastille, Pluronic® F 68 LF Pastille, Pluronic® F 68 Pastille, Pluronic® F 77 Micropastille, and Pluronic® F 88 Pastille.

Downhole Composition.

The copolymer surfactant or a composition including the copolymer surfactant can be combined with any suitable downhole fluid at least one of before and during placement of the composition including the copolymer surfactant in the subterranean formation. In some examples, the copolymer surfactant or a composition including the copolymer surfactant is combined with a downhole fluid above the surface, and then the combined composition is placed in a subterranean formation or contacted with a subterranean material. In another example, the copolymer surfactant or a composition including the copolymer surfactant is injected into a subterranean formation to combine with a downhole fluid, and the combined composition is contacted with a subterranean material or is considered to be placed in the subterranean formation. In various examples, at least one of prior to, during, and after the placement of a composition including the copolymer surfactant in the subterranean formation or contacting of the subterranean material and a composition including the copolymer surfactant, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

In various embodiments, the method includes combining the copolymer surfactant or a composition including the copolymer surfactant with any suitable downhole fluid, such as an aqueous or oil-based fluid including a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form the composition including the copolymer surfactant that is placed downhole. Any suitable weight percent of a composition that is placed in the subterranean formation or contacted with the subterranean material can be the copolymer surfactant, such as about 0.00000001 wt % to 99.999.99 wt %, 0.0001-99.9 wt %, 0.1 wt % to 99.9 wt %, or about 20-90 wt %, or about 0.00000001 wt % or less, or about 0.000001 wt %, 0.0001, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.9999, or about 99.99999 wt % or of the composition.

In some embodiments, the composition including the copolymer surfactant can include any suitable amount of any suitable material used in a downhole fluid. For example, the composition can include water, saline, aqueous base, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, corrosion inhibitors, gases, weight reducing additives, heavy-weight additives, lost circulation materials, filtration control additives, salts, fibers, thixotropic additives, breakers, cross-linkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, the composition can include one or more additive components such as: thinner additives such as COLDTROL®, ATC®, OMC 2™ and OMC 42™; RHEMOD™, a viscosifier and suspension agent including a modified fatty acid; additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a high temperature high pressure (HTHP) filtration control agent including a crosslinked copolymer; DURATONE® HT, a filtration control agent that includes an organophilic lignite, more particularly organophilic leonardite; THERMO TONE™, a HTHP filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARACARB®, a bridging agent which includes a sized calcium carbonate (ground marble); BAROID®, a weighting agent that includes barium sulfate; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber; STEEL-SEAL®, a lost circulation material including a polymer; HYDRO-PLUG®, a lost circulation material including a Portland cement formulation; lime, which can provide alkalinity and can activate certain emulsifiers; and calcium chloride, which can provide salinity.

In some embodiments, the composition including the copolymer surfactant can include a bentonite component. The bentonite component can include at least one of sodium bentonite and calcium bentonite. The bentonite component includes montmorillonite having the formula $(Na,Ca)_{0.33}(Al,Mg,Fe)_2(Si_4O_{10})(OH)_2 \cdot nH_2O$. The bentonite component can include sodium montmorillonite. About 40 wt % to about 100 wt % of the bentonite component can be montmorillonite, or about 40 wt % or less, 45 wt %, 50, 55, 60, 65, 70, 75, 80, 85, 90, 95, or about 100 wt %. About 5 wt % to about 20 wt % of the bentonite component can be at least one of feldspar, quartz, gypsum, dolomite, illite, mica, and calcite, such as about 7 wt % to about 13 wt %, or about 5 wt % or less, or about 6, 7, 8, 9, 10, 11, 12, 13, 14, 15, 16, 17, 18, 19, or about 20 wt % or more. Any suitable proportion of the composition can be bentonite, such as about 0.01 wt % to about 60 wt % of the composition, or about 0.01 wt % or less, 0.1 wt %, 1, 2, 3, 4, 5, 10, 15, 20, 25, 30, 35, 40, 45, 50, 55, or about 60 wt % or more.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill-string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. The drilling fluid can be present in a composition including the copolymer surfactant in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the composition.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the composition.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 ($5^{th}$ ed. 1988). An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The copolymer surfactant can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the composition can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition can include any suitable amount of proppant, such as about 0.000.1 wt %-99.9 wt %, 0.1 wt % to 80 wt %, or about 10 wt %-60 wt %, or about 0.00000001 wt % or less, or about 0.000001 wt %, 0.0001, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9 wt %, or about 99.99 wt % or more.

Drilling Assembly.

The hydroxy-terminated poly(alkylene oxide) copolymer surfactant disclosed herein may directly or indirectly affect one or more components or pieces of equipment associated with the preparation, delivery, recapture, recycling, reuse, and/or disposal of the disclosed composition including the copolymer surfactant. For example, and with reference to FIG. 1, the disclosed composition including the copolymer surfactant may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill-string 108. The drill-string 108 may include, but is not limited to, drill pipe and coiled tubing, as generally known to those skilled in the art. A kelly 110 supports the drill-string 108 as it is lowered through a rotary table 112. A drill bit 114 is attached to the distal end of the drill-string 108 and is driven either by a downhole motor and/or via rotation of the drill-string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill-string 108 and through one or more orifices in the drill bit 114. The drilling fluid 122 is then circulated back to the surface via an annulus 126 defined between the drill-string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The copolymer surfactant or a composition including the copolymer surfactant may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the copolymer surfactant or the composition including the copolymer surfactant may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more solid or fluid storage facilities and/or units where the copolymer surfactant or a composition including the copolymer surfactant may be stored, reconditioned, and/or regulated until added to the drilling fluid 122.

As mentioned above, the copolymer surfactant or a composition including the copolymer surfactant may directly or indirectly affect the components and equipment of the drilling assembly 100. For example, the copolymer surfactant or a composition including the copolymer surfactant may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the composition including the copolymer surfactant.

The copolymer surfactant or a composition including the copolymer surfactant may directly or indirectly affect the pump 120, which representatively includes any conduits, pipelines, trucks, tubulars, and/or pipes used to fluidically convey the composition including the copolymer surfactant downhole, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The copolymer surfactant or a composition including the copolymer surfactant may also directly or indirectly affect the mixing hopper 134 and the retention pit 132 and their assorted variations.

The copolymer surfactant or a composition including the copolymer surfactant may also directly or indirectly affect the various downhole equipment and tools that may come into contact with the copolymer surfactant or a composition including the copolymer surfactant such as, but not limited to, the drill-string 108, any floats, drill collars, mud motors, downhole motors, and/or pumps associated with the drill-string 108, and any measurement while drilling (MWD)/logging while drilling (LWD) tools and related telemetry equipment, sensors, or distributed sensors associated with the drill-string 108. The copolymer surfactant or a composition including the copolymer surfactant may also directly or indirectly affect any downhole heat exchangers, valves and corresponding actuation devices, tool seals, packers and other wellbore isolation devices or components, and the like associated with the wellbore 116. The copolymer surfactant or a composition including the copolymer surfactant may also directly or indirectly affect the drill bit 114, which may include, but is not limited to, roller cone bits, polycrystalline diamond compact (PDC) bits, natural diamond bits, any hole openers, reamers, coring bits, and the like.

While not specifically illustrated herein, the copolymer surfactant or a composition including the copolymer surfactant may also directly or indirectly affect any transport or delivery equipment used to convey the composition including the copolymer surfactant to the drilling assembly 100 such as, for example, any transport vessels, conduits, pipelines, trucks, tubulars, and/or pipes used to fluidically move the composition including the copolymer surfactant from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

System or Apparatus.

In various embodiments, the present invention provides a system. The system can be any suitable system that can include the use of the copolymer surfactant described herein in a subterranean formation, or that can include performance of a method for using the copolymer surfactant described herein. The system can include a composition including a hydroxy-terminated poly(alkylene oxide) copolymer surfactant. The system can also include a subterranean formation including the composition therein. In some embodiments, the composition in the system can also include a downhole fluid, such as a drilling fluid or a hydraulic fracturing fluid.

In various embodiments, the present invention provides an apparatus. The apparatus can be any suitable apparatus that can include the use of the hydroxy-terminated poly (alkylene oxide) copolymer surfactant described herein in a subterranean formation, or that can include performance of a method for using the copolymer surfactant described herein.

Various embodiments provide systems and apparatus configured for delivering the composition described herein to a downhole location and for using the composition therein, such as for drilling or hydraulic fracturing. The system or apparatus can include a drill-string disposed in a wellbore, the drill-string including a drill bit at the downhole end of the drill-string. The system or apparatus can include an annulus between the drill-string and the wellbore. The system or apparatus can include a pump configured to circulate the composition through the drill-string, through the drill bit, and back above-surface through the annulus. The system or apparatus can further include a fluid processing unit configured to process the composition exiting the annulus to generate a cleaned drilling fluid for recirculation through the wellbore. In various embodiments, the systems can include a pump fluidly coupled to a tubular (e.g., any suitable type of oilfield pipe, such as pipeline, drill pipe, production tubing, and the like), the tubular containing a composition including the copolymer surfactant described herein. The tubular can be disposed in a wellbore. The pump can be configured to pump the composition downhole.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery downhole.

Figure 2:
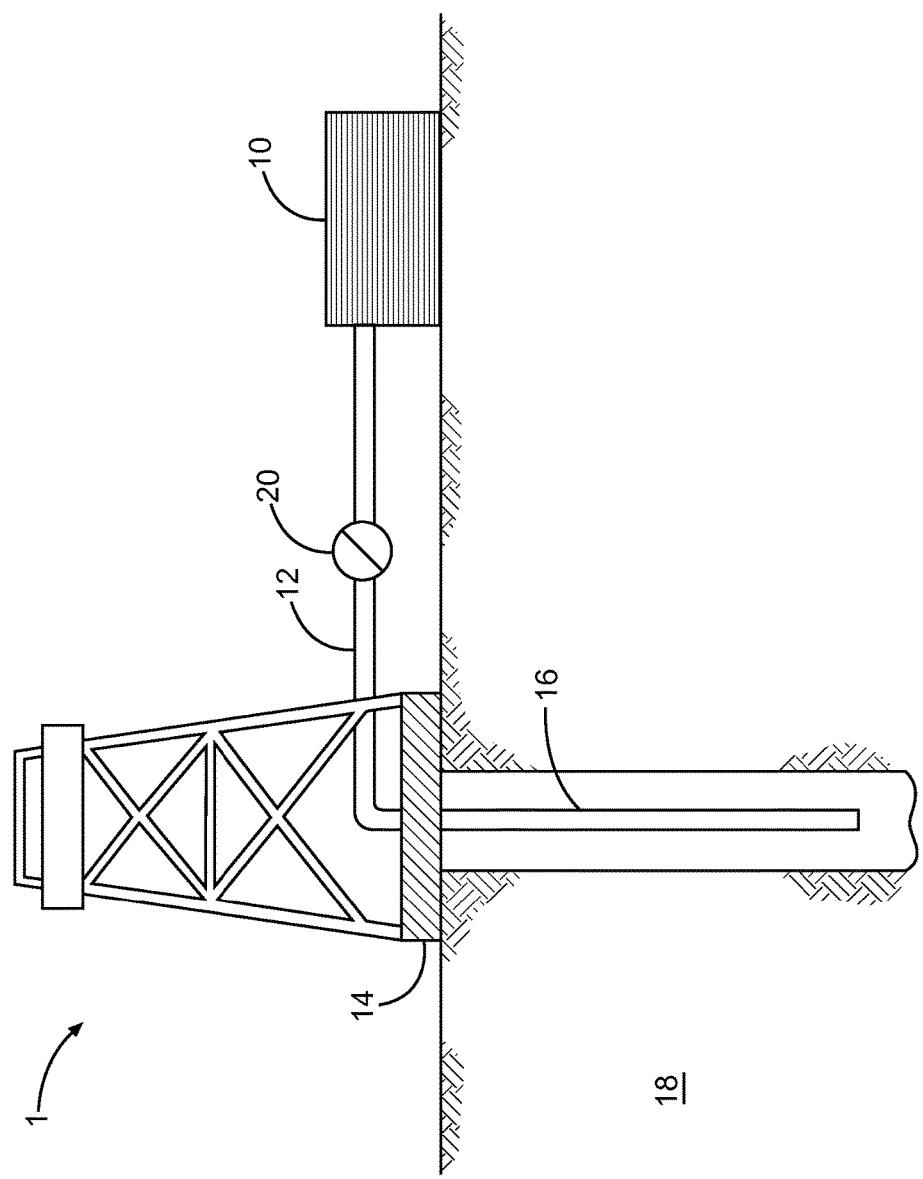
FIG. 2 illustrates a system or apparatus for delivering a composition downhole, in accordance with various embodiments.

FIG. 2 shows an illustrative schematic of systems and apparatuses that can deliver embodiments of the compositions of the present invention to a downhole location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of the copolymer surfactant, or can include substantially no copolymer surfactant therein. In some embodiments, the composition that has flowed back to wellhead 14 can subsequently be recovered, and in some examples reformulated, and recirculated to subterranean formation 18.

It is also to be recognized that the disclosed copolymer surfactant and composition including the same can also directly or indirectly affect the various downhole equipment and tools that can come into contact with the composition during operation. Such equipment and tools can include, but are not limited to, wellbore casing, wellbore liner, completion string, insert strings, drill-string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components can be included in the systems and apparatuses generally described above and depicted in FIG. 2.

Composition for Treatment of a Subterranean Formation.

Various embodiments provide a composition for treatment of a subterranean formation. The composition can be any suitable composition that can be used to perform an embodiment of the method for treatment of a subterranean formation described herein.

For example, the composition can include a hydroxy-terminated poly(alkylene oxide) copolymer surfactant, such as any hydroxy-terminated poly(alkylene oxide) copolymer surfactant described herein. In some embodiments, the composition further includes a downhole fluid. The downhole fluid can be any suitable downhole fluid. In some embodiments, the downhole fluid is a composition for fracturing of a subterranean formation or subterranean material, or a fracturing fluid, such as an aqueous fracturing fluid. In some embodiments, the downhole fluid is a drilling fluid, such as an aqueous drilling fluid. The composition can include a bentonite component, such as any bentonite component described herein.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a hydroxy-terminated poly(alkylene oxide) copolymer surfactant, such as any hydroxy-terminated poly(alkylene oxide) copolymer surfactant described herein. The composition can further include a downhole fluid. In some embodiments, the composition can be a drilling fluid composition, or a hydraulic fracturing composition.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments.

The following exemplary embodiments are provided, the numbering of which is not to be construed as designating levels of importance:

Embodiment 1 provides a method of treating a subterranean formation, the method comprising:
  obtaining or providing a composition comprising a hydroxy-terminated poly(alkylene oxide) copolymer surfactant comprising
  a first repeating unit having the structure —[$R_1O$]—, wherein at each occurrence $R^1$ is independently a substituted or unsubstituted ($C_2$-$C_{10}$)alkylene group; and
  a second repeating unit having the structure —[$R_2O$]—, wherein at each occurrence $R^2$ is independently a substituted or unsubstituted ($C_2$-$C_{10}$)alkylene group;
  wherein the first repeating unit has a lower molecular weight than the second repeating unit, the first repeating unit and the second repeating unit have a random copolymer or block copolymer arrangement in the copolymer surfactant, and at least one of
    a) the copolymer surfactant has a Davies HLB value of at least about 15, and
    b) the copolymer surfactant has a molecular weight of about 2,000 to about 25,000 and a total weight of the first repeating units is about 10 wt % to about 95 wt % of the copolymer surfactant; and
  placing the composition in a subterranean formation downhole.

Embodiment 2 provides the method of Embodiment 1, wherein the method is a method of drilling.

Embodiment 3 provides the method of any one of Embodiments 1-2, wherein the composition further comprises a drilling fluid.

Embodiment 4 provides the method of Embodiment 3, wherein the drilling fluid comprises an aqueous drilling fluid.

Embodiment 5 provides the method of any one of Embodiments 1-4, wherein the composition comprises a bentonite component.

Embodiment 6 provides the method of Embodiment 5, wherein the bentonite component comprises at least one of sodium bentonite and calcium bentonite.

Embodiment 7 provides the method of any one of Embodiments 5-6, wherein the bentonite component comprises montmorillonite having the formula $(Na,Ca)_{0.33}(Al, Mg,Fe)_2(Si_4O_{10})(OH)_2 \cdot nH_2O$.

Embodiment 8 provides the method of any one of Embodiments 5-7, wherein the bentonite component comprises sodium montmorillonite.

Embodiment 9 provides the method of any one of Embodiments 5-8, wherein about 40 wt % to about 100 wt % of the bentonite component is montmorillonite.

Embodiment 10 provides the method of any one of Embodiments 5-9, wherein about 5 wt % to about 20 wt % of the bentonite component is at least one of feldspar, quartz, gypsum, dolomite, illite, mica, and calcite.

Embodiment 11 provides the method of any one of Embodiments 1-10, wherein about 0.01 wt % to about 60 wt % of the composition is bentonite.

Embodiment 12 provides the method of any one of Embodiments 1-11, wherein the obtaining or providing of the composition comprises obtaining or providing a drilling fluid; and combining the hydroxy-terminated poly(alkylene oxide) copolymer surfactant with the drilling fluid, to provide the composition.

Embodiment 13 provides the method of any one of Embodiments 1-12, further comprising performing a drilling operation after placing the composition in the subterranean formation.

Embodiment 14 provides the method of any one of Embodiments 1-13, wherein placing the composition in the subterranean formation comprises pumping the composition into a drill-string disposed in a wellbore, the drill-string comprising a drill bit at a downhole end of the drill-string.

Embodiment 15 provides the method of Embodiment 14, wherein the method further comprises circulating the composition through the drill-string, through the drill bit, and back above-surface through an annulus between the drill-string and the wellbore.

Embodiment 16 provides the method of Embodiment 15, further comprising processing a composition exiting the annulus with at least one fluid processing unit to generate a cleaned composition and recirculating the cleaned composition through the wellbore.

Embodiment 17 provides the method of any one of Embodiments 1-16, wherein the method is a method of hydraulic fracturing.

Embodiment 18 provides the method of any one of Embodiments 1-17, wherein the composition further comprises a fracturing fluid.

Embodiment 19 provides the method of Embodiment 18, wherein the fracturing fluid comprises a proppant, a resin-coated proppant, or a combination thereof.

Embodiment 20 provides the method of any one of Embodiments 18-19, wherein the fracturing fluid comprises an aqueous fracturing fluid.

Embodiment 21 provides the method of any one of Embodiments 1-20, wherein the obtaining or providing of the composition comprises obtaining or providing a fracturing fluid; and combining the hydroxy-terminated poly(alkylene oxide) copolymer surfactant with the fracturing fluid, to provide the composition.

Embodiment 22 provides the method of any one of Embodiments 1-21, wherein placing the composition in the subterranean formation comprises pumping the composition into the subterranean formation via a tubular, the method further comprising fracturing the subterranean formation.

Embodiment 23 provides the method of any one of Embodiments 1-22, further comprising performing a hydraulic fracturing operation at least one of during and after placing the composition in the subterranean formation.

Embodiment 24 provides the method of any one of Embodiments 1-23, wherein the obtaining or providing of the composition occurs above-surface.

Embodiment 25 provides the method of any one of Embodiments 1-24, wherein the obtaining or providing of the composition occurs downhole.

Embodiment 26 provides the method of any one of Embodiments 1-25, wherein the copolymer surfactant is combined with a downhole fluid to provide the composition before the placement of the composition in the subterranean formation.

Embodiment 27 provides the method of any one of Embodiments 1-26, wherein the copolymer surfactant is combined with a downhole fluid to provide the composition at least one of during and after the placement of the composition in the subterranean formation.

Embodiment 28 provides the method of any one of Embodiments 1-27, wherein the hydroxy-terminated poly (alkylene oxide) copolymer surfactant is about 0.01 wt % to about 20 wt % of the composition.

Embodiment 29 provides the method of any one of Embodiments 1-28, wherein the hydroxy-terminated poly (alkylene oxide) copolymer surfactant is about 0.1 wt % to about 10 wt % of the composition.

Embodiment 30 provides the method of any one of Embodiments 1-29, wherein as compared to a corresponding composition not comprising the hydroxy-terminated poly (alkylene oxide) copolymer surfactant, the composition has a viscosity that is about 0% to about 60% lower.

Embodiment 31 provides the method of any one of Embodiments 1-30, wherein as compared to a corresponding composition not comprising the hydroxy-terminated poly (alkylene oxide) copolymer surfactant, the composition has a viscosity that is about 0% to about 10% lower.

Embodiment 32 provides the method of any one of Embodiments 1-31, wherein the hydroxy-terminated poly (alkylene oxide) copolymer surfactant has a melting point of about 30° C. to about 100° C.

Embodiment 33 provides the method of any one of Embodiments 1-32, wherein the hydroxy-terminated poly (alkylene oxide) copolymer surfactant has a melting point of about 40° C. to about 65° C.

Embodiment 34 provides the method of any one of Embodiments 1-33, wherein a 1% aqueous solution of the hydroxy-terminated poly(alkylene oxide) copolymer surfactant has a cloud point of greater than about 50° C.

Embodiment 35 provides the method of any one of Embodiments 1-34, wherein a 1% aqueous solution of the hydroxy-terminated poly(alkylene oxide) copolymer surfactant has a cloud point of greater than about 80° C.

Embodiment 36 provides the method of any one of Embodiments 1-35, wherein the hydroxy-terminated poly (alkylene oxide) copolymer surfactant has a water solubility at 25° C. of about 0.000001 g/100 g water to about 50 g/100 g water.

Embodiment 37 provides the method of any one of Embodiments 1-36, wherein the hydroxy-terminated poly (alkylene oxide) copolymer surfactant has a water solubility at 25° C. of about 0.1 g/100 g water to about 25 g/100 g water.

Embodiment 38 provides the method of any one of Embodiments 1-37, wherein about 1 wt % to about 100 wt % of the hydroxy-terminated poly(alkylene oxide) copolymer surfactant is dissolved in the composition.

Embodiment 39 provides the method of any one of Embodiments 1-38, wherein about 1 wt % to about 50 wt % of the hydroxy-terminated poly(alkylene oxide) copolymer surfactant is dissolved in the composition.

Embodiment 40 provides the method of any one of Embodiments 1-39, wherein about 50 wt % to about 100 wt % of the hydroxy-terminated poly(alkylene oxide) copolymer surfactant is dissolved in the composition.

Embodiment 41 provides the method of any one of Embodiments 1-40, wherein the hydroxy-terminated poly (alkylene oxide) copolymer surfactant is linear.

Embodiment 42 provides the method of any one of Embodiments 1-41, wherein the only repeating units of the hydroxy-terminated poly(alkylene oxide) copolymer surfactant are the first repeating unit and the second repeating unit.

Embodiment 43 provides the method of any one of Embodiments 1-42, wherein the Davies HLB value comprises [number of OH groups in the copolymer surfactant]× 1.5+[number of oxyethyl units in the copolymer surfactant]× 0.33−[number of oxypropyl units in the copolymer surfactant]×0.15.

Embodiment 44 provides the method of any one of Embodiments 1-43, wherein the Davies HLB value of the hydroxy-terminated poly(alkylene oxide) copolymer surfactant is at least about 20.

Embodiment 45 provides the method of any one of Embodiments 1-44, wherein the Davies HLB value of the hydroxy-terminated poly(alkylene oxide) copolymer surfactant is at least about 24.

Embodiment 46 provides the method of any one of Embodiments 1-45, wherein the Davies HLB value of the hydroxy-terminated poly(alkylene oxide) copolymer surfactant is about 15 to about 150.

Embodiment 47 provides the method of any one of Embodiments 1-46, wherein the Davies HLB value of the hydroxy-terminated poly(alkylene oxide) copolymer surfactant is about 20 to about 100.

Embodiment 48 provides the method of any one of Embodiments 1-47, wherein a number-average molecular weight of the hydroxy-terminated poly(alkylene oxide) copolymer surfactant is about 1,000 to about 120,000.

Embodiment 49 provides the method of any one of Embodiments 1-48, wherein a number-average molecular weight of the hydroxy-terminated poly(alkylene oxide) copolymer surfactant is about 4,500 to about 15,000.

Embodiment 50 provides the method of any one of Embodiments 1-49, wherein a total weight of the first repeating units is about 50 wt % to about 95 wt % of the hydroxy-terminated poly(alkylene oxide) copolymer surfactant.

Embodiment 51 provides the method of any one of Embodiments 1-50, wherein a total weight of the first repeating units is about 60 wt % to about 90% of the hydroxy-terminated poly(alkylene oxide) copolymer surfactant.

Embodiment 52 provides the method of any one of Embodiments 1-51, wherein a number-average molecular weight of all of the first repeating units of the hydroxy-terminated poly(alkylene oxide) copolymer surfactant is about 500 to about 120,000.

Embodiment 53 provides the method of any one of Embodiments 1-52, wherein a number-average molecular weight of all of the first repeating units of the hydroxy-terminated poly(alkylene oxide) copolymer surfactant is about 2,300 to about 40,000.

Embodiment 54 provides the method of any one of Embodiments 1-53, wherein a total weight of the second repeating units is about 5 wt % to about 50 wt % of the hydroxy-terminated poly(alkylene oxide) copolymer surfactant.

Embodiment 55 provides the method of any one of Embodiments 1-54, wherein a total weight of the second repeating unit is about 10 wt % to about 40 wt % of the hydroxy-terminated poly(alkylene oxide) copolymer surfactant.

Embodiment 56 provides the method of any one of Embodiments 1-55, wherein a number-average molecular weight of all of the second repeating units of the hydroxy-terminated poly(alkylene oxide) copolymer surfactant is about 500 to about 6,000.

Embodiment 57 provides the method of any one of Embodiments 1-56, wherein a number-average molecular weight of all of the second repeating units of the hydroxy-terminated poly(alkylene oxide) copolymer surfactant is about 950 to about 4,000.

Embodiment 58 provides the method of any one of Embodiments 1-57, wherein the hydroxy-terminated poly(alkylene oxide) copolymer surfactant has the structure:

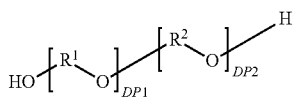

wherein
the repeating units have a random or block copolymer arrangement in the copolymer surfactant;
DP1 is about 10 to about 2800; and
DP2 is about 50 to about 910.

Embodiment 59 provides the method of Embodiment 58, wherein DP1 is about 50 to about 910.

Embodiment 60 provides the method of any one of Embodiments 58-59, wherein DP2 is about 70 to about 260.

Embodiment 61 provides the method of any one of Embodiments 1-60, wherein at each occurrence $R^1$ is independently a $(C_2-C_{10})$alkylene group.

Embodiment 62 provides the method of any one of Embodiments 1-61, wherein at each occurrence $R^1$ is independently a $(C_2-C_5)$alkylene group.

Embodiment 63 provides the method of any one of Embodiments 1-62, wherein at each occurrence $R^1$ is independently a $(C_2-C_3)$alkylene group.

Embodiment 64 provides the method of any one of Embodiments 1-63, wherein $R^1$ is ethylene.

Embodiment 65 provides the method of any one of Embodiments 1-64, wherein the first repeating unit is oxyethyl.

Embodiment 66 provides the method of any one of Embodiments 1-65, wherein at each occurrence $R^2$ is independently a $(C_2-C_{10})$alkylene group.

Embodiment 67 provides the method of any one of Embodiments 1-66, wherein at each occurrence $R^2$ is independently a $(C_2-C_5)$alkylene group.

Embodiment 68 provides the method of any one of Embodiments 1-67, wherein at each occurrence $R^2$ is independently a $(C_3-C_4)$alkylene group.

Embodiment 69 provides the method of any one of Embodiments 1-68, wherein at each occurrence $R^2$ is independently a $(C_3)$alkylene group.

Embodiment 70 provides the method of any one of Embodiments 1-69, wherein $R^2$ at each occurrence is a propyl group connected to a backbone of the copolymer via the 1- and 2-positions.

Embodiment 71 provides the method of any one of Embodiments 1-70, wherein the second repeating unit at each occurrence is independently selected from the group consisting of a 1-oxy-prop-2-yl group and a 2-oxy-prop-1-yl group.

Embodiment 72 provides the method of any one of Embodiments 58-71, wherein the hydroxy-terminated poly(alkylene oxide) copolymer surfactant has the structure:

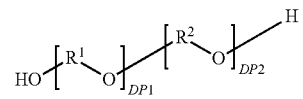

wherein the first repeating unit and the second repeating unit are in a block-copolymer arrangement in the order shown.

Embodiment 73 provides the method of any one of Embodiments 58-72, wherein the hydroxy-terminated poly(alkylene oxide) copolymer surfactant has the structure:

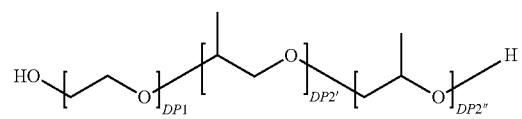

wherein
the repeating units having subscripts DP2' and DP2" together are the second repeating unit, wherein DP2' is about 0 to about 910, DP2" is about 0 to about 910, and DP2'+DP2"=DP2; and
the first repeating unit and the second repeating unit are in a block-copolymer arrangement in the order shown, and the 1-oxy-prop-2-yl and 2-oxy-prop-1-yl units occur in a block or random arrangement within each poly(propylene oxide) block.

Embodiment 74 provides the method of any one of Embodiments 58-73, wherein the hydroxy-terminated poly(alkylene oxide) copolymer surfactant has the structure:

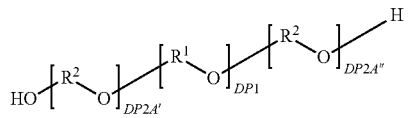

wherein
DP2A' is about 0 to about 910, DP2A" is about 0 to about 910, and DP2A'+DP2A"=DP2; and
the first repeating unit and the second repeating units are in a block-copolymer arrangement in the order shown.

Embodiment 75 provides the method of Embodiment 74, wherein the hydroxy-terminated poly(alkylene oxide) copolymer surfactant has the structure:

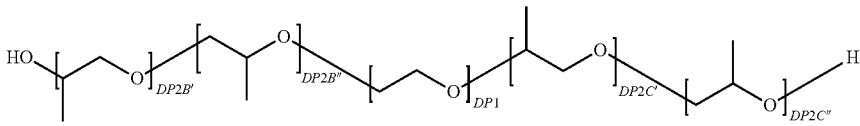

wherein
the repeating units having subscripts DP2B' and DP2B" together are at least one of the second repeating units, the repeating units having subscripts DP2C' and DP2C" together are at least one of the second repeating units, DP2B' is about 0 to about 910, DP2B" is about 0 to about 910, DP2B'+DP2B"=DP2A', DP2C' is about 0 to about 910, and DP2C" is about 0 to about 910; DP2C'+DP2C"=DP2A"; and
the first repeating unit and the second repeating unit are in a block-copolymer arrangement in the order shown, and the 1-oxy-prop-2-yl and 2-oxy-prop-1-yl units occur in a block or random arrangement within each poly(propylene oxide) block.

Embodiment 76 provides the method of any one of Embodiments 58-75, wherein the hydroxy-terminated poly(alkylene oxide) copolymer surfactant has the structure:

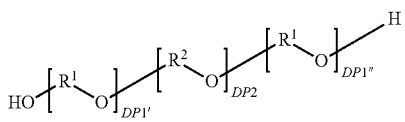

wherein
DP1' is about 0 to about 2800, DP1" is about 0 to about 2800, and DP1'+DP1"=DP1; and
the first repeating unit and the second repeating units are in a block-copolymer arrangement in the order shown.

Embodiment 77 provides the method of any one of Embodiments 58-76, wherein the hydroxy-terminated poly(alkylene oxide) copolymer surfactant has the structure:

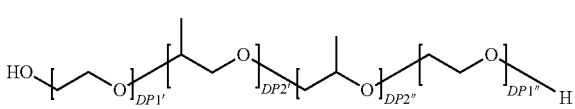

wherein
DP1' is about 0 to about 2800, DP1" is about 0 to about 2800, and DP1'+DP1"=DP1, the repeating units having subscripts DP2' and DP2" together are the second repeating unit, DP2' is about 0 to about 910, DP2" is about 0 to about 910, and DP2'+DP2"=DP2; and
the first repeating unit and the second repeating unit are in a block-copolymer arrangement in the order shown, and the 1-oxy-prop-2-yl and 2-oxy-prop-1-yl units occur in a block or random arrangement within each poly(propylene oxide) block.

Embodiment 78 provides the method of any one of Embodiments 1-77, wherein the composition further comprises an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 79 provides the method of Embodiment 78, wherein the cementing fluid comprises Portland cement, pozzolana cement, gypsum cement, high alumina content cement, slag cement, silica cement, or a combination thereof.

Embodiment 80 provides the method of any one of Embodiments 1-79, wherein at least one of prior to, during, and after the placing of the composition in the subterranean formation, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 81 provides the method of any one of Embodiments 1-80, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 82 provides a method of treating a subterranean formation, the method comprising:
obtaining or providing a composition comprising a hydroxy-terminated poly(alkylene oxide) copolymer surfactant having a first repeating unit and a second repeating unit, the first repeating unit having the structure —[R$_1$O]— wherein R$^1$ is an ethylene group, and the second repeating unit having the structure —[R$_2$O]— wherein R$^2$ is a propylene group, wherein the first repeating unit has a lower molecular weight than the second repeating unit, the first repeating unit and the second repeating unit have a random copolymer or block copolymer arrangement in the copolymer surfactant, and the copolymer surfactant has a Davies HLB value of about 20 to about 100 calculated as [number of OH groups in the copolymer surfactant]×1.5+[number of oxyethyl units in the copolymer surfactant]×0.33−[number of oxypropyl units in the copolymer surfactant]×0.15; and placing the composition in a subterranean formation downhole.

Embodiment 83 provides a method of treating a subterranean formation, the method comprising:
  obtaining or providing a composition comprising a hydroxy-terminated poly(alkylene oxide) copolymer surfactant having a first repeating unit and a second repeating unit, the first repeating unit having the structure —[$R_1$O]— wherein $R^1$ is an ethylene group, and the second repeating unit having the structure —[$R_2$O]— wherein $R^2$ is a propylene group, wherein the first repeating unit has a lower molecular weight than the second repeating unit, the first repeating unit and the second repeating unit have a random copolymer or block copolymer arrangement in the copolymer surfactant, and the copolymer surfactant has a molecular weight of about 4,500 to about 15,000 and a total weight of all of the first repeating units is about 60 wt % to about 90 wt % of the copolymer surfactant; and
  placing the composition in a subterranean formation downhole.

Embodiment 84 provides a method of treating a subterranean formation, the method comprising:
  obtaining or providing a hydroxy-terminated poly(alkylene oxide) copolymer surfactant having a first repeating unit and a second repeating unit, the first repeating unit having the structure —[$R_1$O]— wherein $R^1$ is an ethylene group, and the second repeating unit having the structure —[$R_2$O]— wherein $R^2$ is a propylene group, wherein the first repeating unit has a lower molecular weight than the second repeating unit, the first repeating unit and the second repeating unit have a random copolymer or block copolymer arrangement in the copolymer surfactant, wherein the copolymer surfactant is a solid at room temperature;
  combining the copolymer surfactant with a downhole fluid, to form a downhole composition; and
  placing the composition in a subterranean formation downhole.

Embodiment 85 provides a system comprising:
  a composition comprising a hydroxy-terminated poly(alkylene oxide) copolymer surfactant comprising
    a first repeating unit having the structure —[$R_1$O]—, wherein at each occurrence $R^1$ is independently a substituted or unsubstituted ($C_2$-$C_{10}$)alkylene group; and
    a second repeating unit having the structure —[$R_2$O]—, wherein at each occurrence $R^2$ is independently a substituted or unsubstituted ($C_2$-$C_{10}$)alkylene group;
    wherein the first repeating unit has a lower molecular weight than the second repeating unit, the first repeating unit and the second repeating unit have a random copolymer or block copolymer arrangement in the copolymer surfactant, and at least one of
      a) the copolymer surfactant has a Davies HLB value of at least about 15, and
      b) the copolymer surfactant has a molecular weight of about 2,000 to about 25,000 and a total weight of all of the first repeating units are about 10 wt % to about 95 wt % of the copolymer surfactant; and
  a subterranean formation comprising the composition therein.

Embodiment 86 provides the system of Embodiment 85, further comprising
  a drill-string disposed in a wellbore, the drill-string comprising a drill bit at the downhole end of the drill-string;
  an annulus between the drill-string and the wellbore; and
  a pump configured to circulate the composition through the drill-string, through the drill bit, and back above-surface through the annulus.

Embodiment 87 provides the system of Embodiment 86, further comprising a fluid processing unit configured to process the composition exiting the annulus to generate a cleaned drilling fluid for recirculation through the wellbore.

Embodiment 88 provides the system of any one of Embodiments 85-87, further comprising a tubular disposed in a wellbore; and a pump configured to pump the composition downhole.

Embodiment 89 provides a composition for treatment of a subterranean formation, the composition comprising:
  a hydroxy-terminated poly(alkylene oxide) copolymer surfactant comprising
    a first repeating unit having the structure —[$R_1$O]—, wherein at each occurrence $R^1$ is independently a substituted or unsubstituted ($C_2$-$C_{10}$)alkylene group; and
    a second repeating unit having the structure —[$R_2$O]—, wherein at each occurrence $R^2$ is independently a substituted or unsubstituted ($C_2$-$C_{10}$)alkylene group;
    wherein the first repeating unit has a lower molecular weight than the second repeating unit, the first repeating unit and the second repeating unit have a random copolymer or block copolymer arrangement in the copolymer surfactant, and at least one of
      a) the copolymer surfactant has a Davies HLB value of at least about 15, and
      b) the copolymer surfactant has a molecular weight of about 2,000 to about 25,000 and a total weight of all of the first repeating units is about 10 wt % to about 95 wt % of the copolymer surfactant; and
  a downhole fluid.

Embodiment 90 provides the composition of Embodiment 89, wherein the composition comprises a bentonite component.

Embodiment 91 provides the composition of any one of Embodiments 89-90, wherein the downhole fluid is a fracturing fluid.

Embodiment 92 provides the composition of any one of Embodiments 89-91, wherein the downhole fluid is a drilling fluid.

Embodiment 93 provides a method of preparing a composition for treatment of a subterranean formation, the method comprising:
  forming a composition comprising a hydroxy-terminated poly(alkylene oxide) copolymer surfactant comprising
    a first repeating unit having the structure —[$R_1$O]—, wherein at each occurrence $R^1$ is independently a substituted or unsubstituted ($C_2$-$C_{10}$)alkylene group; and
    a second repeating unit having the structure —[$R_2$O]—, wherein at each occurrence $R^2$ is independently a substituted or unsubstituted ($C_2$-$C_{10}$)alkylene group;
    wherein the first repeating unit has a lower molecular weight than the second repeating unit, the first repeating unit and the second repeating unit have a random copolymer or block copolymer arrangement in the copolymer surfactant, and at least one of
      a) the copolymer surfactant has a Davies HLB value of at least about 15, and b) the copolymer surfactant has a molecular weight of about 2,000 to about 25,000 and a total weight of all of the first repeating units is about 10 wt % to about 95 wt % of the copolymer surfactant.

Embodiment 94 provides the composition, apparatus, method, or system of any one or any combination of Embodiments 1-93 optionally configured such that all elements or options recited are available to use or select from.

What is claimed is:

1. A method of treating a subterranean formation, the method comprising:
providing a water-based drilling fluid and adding a solid hydroxy-terminated poly(alkylene oxide) copolymer surfactant to the water-based drilling fluid,
wherein the hydroxy-terminated poly(alkylene oxide) copolymer surfactant comprises:
a first repeating unit having the structure —[R$_1$O]—, wherein at each occurrence R$^1$ is an ethylene group; and
a second repeating unit having the structure —[R$_2$O]—, wherein at each occurrence R$^2$ is a propylene group;
wherein the first repeating unit has a lower molecular weight than the second repeating unit, wherein the first repeating unit has a number-average molecular weight of about 5,000 or more, wherein the second repeating unit has a number-average molecular weight of about 2,000 or more, the first repeating unit and the second repeating unit have a random copolymer or block copolymer arrangement in the copolymer surfactant;
wherein the copolymer surfactant has a Davies HLB value of at least about 20 wherein the Davies HLB value is calculated by the following equation:

Davies HLB value=[number of OH groups in the copolymer surfactant]×1.5+[number of oxyethyl units in the copolymer surfactant]×0.33 −[number of oxypropyl units in the copolymer surfactant]×0.15, and wherein the copolymer surfactant has a number-average molecular weight of about 5,000to about 120,000 and a total weight of the first repeating units is about 10 wt % to about 95 wt % of the copolymer surfactant and;
circulating the water-based drilling fluid through a drilling string, through a drill bit, and back above-surface through an annulus between the drill string and a wellbore.

2. The method of claim 1, wherein the water-based drilling fluid comprises a bentonite component.

3. The method of claim 1, wherein the hydroxy-terminated poly(alkylene oxide) copolymer surfactant is about 0.01 wt % to about 20 wt % of the composition.

4. The method of claim 1, wherein the hydroxy-terminated poly(alkylene oxide) copolymer surfactant is linear.

5. The method of claim 1, wherein the only repeating units of the hydroxy-terminated poly(alkylene oxide) copolymer surfactant are the first repeating unit and the second repeating unit.

6. The method of claim 1, wherein the Davies HLB value of the hydroxy-terminated poly(alkylene oxide) copolymer surfactant is about 20 to about 150.

7. The method of claim 1, wherein the hydroxy-terminated poly(alkylene oxide) copolymer surfactant has the structure:

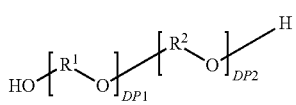

wherein the repeating units have a random or block copolymer arrangement in the copolymer surfactant;
DP1 is about 150 to about 2600; and
DP2 is about 50 to about 910.

8. The method of claim 1, wherein the hydroxy-terminated poly(alkylene oxide) copolymer surfactant has the structure:

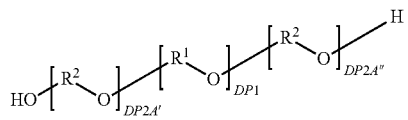

wherein DP2A' is about 50 to about 150, DP2A" is about 0 to about 150, and DP1is about 150 to about 2600, and DP2A'+DP2A"=DP2; and
the first repeating unit and the second repeating units are in a block-copolymer arrangement in the order shown.

9. The method of claim 7, wherein the hydroxy-terminated poly(alkylene oxide) copolymer surfactant has the structure:

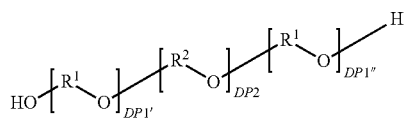

wherein DP1' is about 100 to about 2600, DP1" is about 0 to about 2500, and DP1'+DP1" =DP1; and
the first repeating unit and the second repeating units are in a block-copolymer arrangement in the order shown.

10. A method of treating a subterranean formation, the method comprising:
providing a water-based drilling fluid and adding a solid hydroxy-terminated poly(alkylene oxide) copolymer surfactant to the water-based drilling fluid,
wherein the hydroxy-terminated poly(alkylene oxide) copolymer surfactant comprises:
a first repeating unit and a second repeating unit, wherein the first repeating unit having the structure —[R$_1$O]— wherein R$^1$ is an ethylene group, and the second repeating unit having the structure —[R$_2$O]—wherein R$^2$ is a propylene group, wherein the first repeating unit has a lower molecular weight than the second repeating unit, wherein the first repeating unit has a number-average molecular weight of about 5,000 or more, wherein the second repeating unit has a number-average molecular weight of about 4,000 or more, wherein the first repeating unit and the second repeating unit have a random copolymer or block copolymer arrangement in the copolymer surfactant, wherein the copolymer surfactant has a number-average molecular weight of about 5,000 to about 120,000, and wherein the hydroxy-terminated poly(alkylene oxide) copolymer surfactant has a Davies HLB value of at least about 20, wherein the Davies HLB value is calculated by the following equation:

Davies HLB value=[number of OH groups in the copolymer surfactant]×1.5+[number of oxyethyl units in the copolymer surfactant]×0.33−[number of oxypropyl units in the copolymer surfactant]×0.15, and circulating the drilling fluid through a drilling string, through a drill bit, and back above-surface through an annulus between the drill string and a wellbore.

11. The method of claim 1, wherein the first repeating unit has a number-average molecular weight of about 7,000 or more.

12. A method of treating a subterranean formation, the method comprising:
  providing a water-based drilling fluid and adding a solid hydroxy-terminated poly(alkylene oxide) copolymer surfactant to the water-based drilling fluid,
  wherein the hydroxy-terminated poly(alkylene oxide) copolymer surfactant comprises:
  a first repeating unit having the structure —[$R_1O$]—, wherein at each occurrence $R^1$ is an ethylene group: and
  a second repeating unit having the structure —[$R_2O$]—, wherein at each occurrence $R^2$ is a propylene group;
  wherein the first repeating unit has a lower molecular weight than the second repeating unit, wherein the first repeating unit has a number-average molecular weight of about 3,000 or more, wherein the second repeating unit has a number-average molecular weight of about 4,000 or more, the first repeating unit and the second repeating unit have a random copolymer or block copolymer arrangement in the copolymer surfactant;
  wherein the copolymer surfactant has a Davies HLB value of at least about 20 wherein the Davies HLB value is calculated by the following equation:

Davies HLB value=[number of OH groups in the copolymer surfactant]×1.5 +[number of oxyethyl units in the copolymer surfactant]× 0.33 −[number of oxypropyl units in the copolymer surfactant]×0.15, and wherein the copolymer surfactant has a number-average molecular weight of about 5,000 to about 120,000 and a total weight of the first repeating units is about 10 wt % to about 95 wt % of the copolymer surfactant and;
  circulating the water-based drilling fluid through a drilling string, through a drill bit, and back above-surface through an annulus between the drill string and a wellbore.

13. The method of claim 1, wherein the second repeating unit has a number-average molecular weight of about 6,000 or more.

* * * * *